Jan. 4, 1944. J. K. BOONE 2,338,314
ROTARY WEED ERADICATOR AND HARROW
Filed Feb. 20, 1942
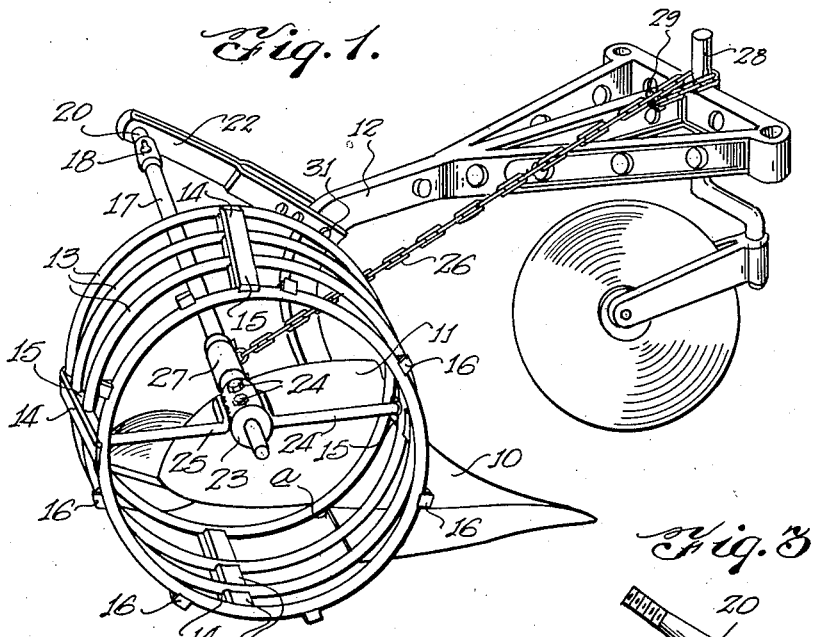
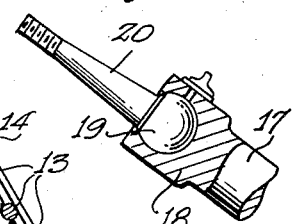
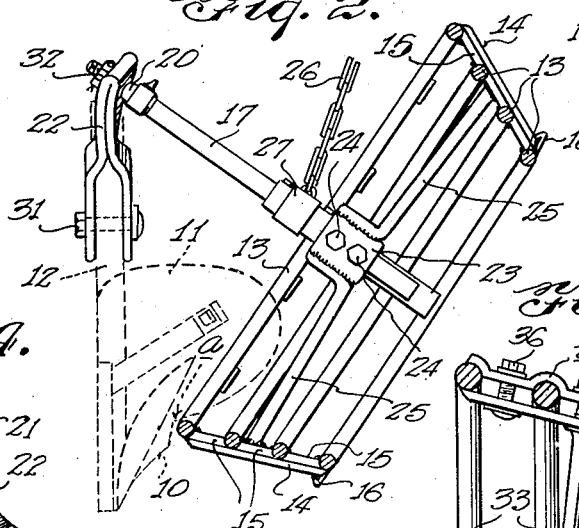
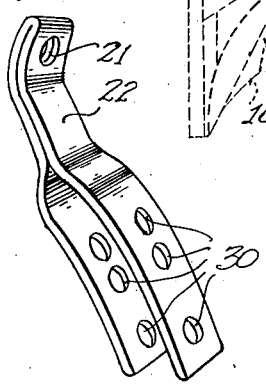
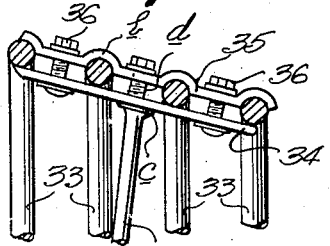
JOHN K. BOONE
INVENTOR.
BY
ATTORNEY Patented Jan. 4, 1944

2,338,314

UNITED STATES PATENT OFFICE 2,338,314

ROTARY WEED ERADICATOR AND HARROW

John K. Boone, Dallas, Tex.

Application February 20, 1942, Serial No. 431,630

4 Claims. (Cl. 97—6)

This invention relates to agricultural implements and more particularly to an attachment for plows which is useful in eradicating or destroying noxious vegetation.

The principal object of the invention is to provide, in combination with a rotary sod disintegrator, a mounting for the latter by which the disintegrator is operatively connected to and drawn by the implement on which it is mounted and, further, a mounting so constructed and arranged that the necessary maximum flexibility between the disintegrator and implement is insured, by means of a ball and socket connection, for optimum results.

Another object of the invention is to provide a sod disintegrator mounting in which the bearing, which makes rotary motion of the disintegrator possible, is disposed well out of range of the sod or soil as the latter falls from the point to which it has been lifted by the disintegrator, so that the bearing will escape the rapid deterioration which would otherwise take place if the bearing were exposed to the soil discharge of the disintegrator.

Another object of the invention is to provide a flexible draft connection between the outer end of the mounting and the frame of the implement on which the disintegrator is mounted, made necessary by the ball and socket connection, which relieves the mounting shaft or disintegrator axle of lateral strains and stresses, the said draft connection being effective to maintain operative relation of the disintegrator to the soil turning plow and to insure against injury thereto by obstacles or sudden rises of the terrene.

With the foregoing objects as paramount, the invention has particular reference to its salient features of construction and arrangement of parts which will become manifest as the description proceeds, taken in connection with the accompanying drawing, wherein:

Figure 1 is a perspective view of a rotary disintegrator, showing the mounting of the present invention.

Figure 2 is a side elevational view of the mounting, with the disintegrator shown in diametrical cross-section.

Figure 3 is a detail view, partly in section, of the ball and socket connection between the disintegrator shaft and implement frame.

Figure 4 is a detail view in perspective of the bracket, to be mounted on the implement frame to receive the ball and socket connection, and Figure 5 is a fragmentary view of the disintegrator, showing a slightly modified example of construction.

It is not the intent herein to claim broadly as new a rotary sod disintegrator consisting of rings or loops of varying diameters connected in spaced relationship to define a coniform cage inasmuch as devices of this nature and construction are well known and have been in use for many years to eradicate grass and weeds. It is, however, the intent to claim as new the mounting for a rotary sod disintegrator which greatly improves the operation and effectiveness of such a disintegrator as above set forth and, further, a mounting which prolongs materially the usefulness of the disintegrator.

Continuing more in detail with the drawing, reference is primarily made to Figure 1 wherein is shown a plow 10 having a moldboard 11 and mounted on a beam 12. Other features of the implement are likewise conventional and it is understood that there is no limitation as to the type of implement with which the invention may operate.

The disintegrator itself is broadly of known design but varies somewhat in specific construction. As shown, it consists of a plurality of rings or hoops 13 spaced apart and of progressively larger diameter from the outside toward the inside in order to produce a coniform cage or basket. The hoops are connected together by means of straps 14, welded or otherwise suitably secured to the outside of the rings, parallel with each other and with the rotary axis of the cage.

As a means to reinforce the structure, short strips 15 are inserted between the hoops in parallel relation to the straps 14 and are welded thereto. The object of the arrangement is to securely hold the rings in proper spaced relationship without leaving recesses or pockets to become filled with dirt and to provide, through the medium of the straps 14, means to insure sufficient traction between the disintegrator and ground to cause the former to rotate as the plow is moved to furrow the soil. To facilitate rotation of the disintegrator, the outer or smaller hoop 13 has affixed at spaced intervals therearound, lugs 16 which engage the soil and prevent slippage of the cage as the latter rotates.

It is important to observe that in applying the straps 14 to the hoops, provision is made to avoid interference between the inner ends of these straps and the cratch of the plow at $a$ in which the inner hoop operates. The straps are simply beveled at their inner ends and consequently present no protuberance likely to engage the plow as the cage rotates.

The mounting for the cage or disintegrator is comprised of a shaft or axle 17 having a recessed enlargement 18 at one end to provide a socket to receive a ball 19. The ball 19 has a tapered pin 20 secured thereto which is received in an aperture 21 in a bracket 22 (Figure 4), to which reference will again be made presently.

Mounted on the shaft 17 is a collar 23. It is to be particularly noted that this collar is fixed to the shaft and held against rotation by means of set screws 24.

Welded or otherwise secured to the collar are arms or spokes 25 which extend radially outward and their ends are affixed to the inserts 15 of the straps 14 as by welding or other means. Thus, it will be seen that as the cage rotates on the ground, the shaft 17 also rotates by reason of the ball and socket connection to the bracket 22.

As a means to hold the attachment in proper operating relationship to the plow, yet permitting elevation thereof over obstacles, a chain 26 has one end connected to a collar 27, rotatably mounted on the shaft inwardly of the collar, with its opposite end connected, as shown, with an upright 28 or other part of the implement frame. A bolt 29 may be employed to retain the chain on its anchor for adjustment, in order to obtain proper relationship between the disintegrator cage and the plow 10.

The bracket 22 is preferably formed by bending a metal strap upon itself and by bending its free ends outwardly so that they will be parallel and will lie on either side of the plow beam 12. Holes 30 are provided to receive bolts 31 for securing the bracket to the beam. The upper end of the bracket is curved so that its face will be at right angles to the axis of the shaft 17 to receive the pin 20. A nut 32 is then applied to the threaded end of the pin, as shown in Figure 2.

In operation, as the moldboard 11 turns the soil, it is deposited into the disintegrator cage which rotates at the proper angle to receive it, as borne out in Figure 2. The sod is elevated by the cage towards the top of the latter and when it is dropped, it falls through the open spaces of the cage into the furrow, with the roots separated and thrown by virtue of the angular position of the cage and its agitation and are exposed on the plowed ground to eventually decompose.

It is clear that by virtue of the ball and socket connection with the plow beam 12, the shaft 17 is permitted to move in any direction without strain, held only against movement rearwardly by the chain pull 26, yet the shaft can rotate; which makes it possible to fixedly mount the disintegrator cage on the shaft which is highly important in that the hub of the disintegrator, which, in the present case is the ball and socket, is well out of the destructive influence of the dirt turned by the cage and can be frequently lubricated, if necessary.

In some cases, it may be desirable, for convenience in shipping, to so construct the disintegrator cage so that it may be disassembled. A slightly modified form of construction of such a cage is shown in Figure 5 wherein the hoops 33 of varying diameters are joined rigidly together by means of an inner strap 34 and an opposing outer strap 35, provided with transverse corrugations b conforming to the outer surfaces of the hoops 33. The two straps are secured together by means of bolts 36, it being pointed out that the ends of the straps at the receiving end of the cage are terminated short of the side of the largest ring in order that they will not interfere with rotation of the cage by striking against the moldboard of the plow, as provided for in the earlier described example of the invention.

The spokes 37 of the cage, while being connected to the collar on the shaft in a manner similar to that earlier described, are, in this case, shouldered at c adjacent their outer ends and threaded to their ends at d. The ends are extended through holes provided in the straps 34 and 35 with the shoulders c bearing against the inner strap 34. A nut 37 is threaded upon the extended ends of the spokes to hold the same securely to the cage. It is apparent that by removing all of the retaining nuts, the spokes may be detached from the cage and the latter dismantled so that the rings or hoops may be nested and crated, together with the other parts for compact shipment.

Manifestly, the construction as shown and described is capable of some modification and such modification as may be construed to fall within the scope and meaning of the appended claims is also considered to be within the spirit and intent of the invention.

What is claimed is:

1. In a plow attachment for eradicating noxious vegetation, a sod disintegrator cage comprised of relatively spaced hoops of varying diameters adapted to receive soil turned by the moldboard of a plow, a mounting therefor, said mounting comprising a shaft having a socket in one end and extending downward at an angle with respect to the beam of said plow, a ball in said socket having a tapered pin extending therefrom, a bracket mounted on said plow beam and apertured to receive said pin, a collar affixed to said shaft at its lower end having arms extending radially outward and joined to said cage and flexible means connected intermediate the ends of said shaft and to said plow for maintaining said cage in operative relation to the moldboard of said plow.

2. A weed eradicating attachment for plows comprising a sod disintegrator cage composed of relatively spaced hoops of varying diameters adapted to receive soil turned by a moldboard, a mounting for said cage comprising an inclined shaft on which said cage is rigidly mounted, a ball and socket carried by the upper end of said shaft, a pin extending from said ball, a bracket secured to the beam of a plow apertured to receive said pin, a second collar loosely carried by said shaft intermediate its ends and held against longitudinal movement thereon and a pull chain connected to said latter collar and to the frame of said plow to hold said cage in operative relation to said moldboard.

3. An attachment for plows comprising an open coniform cage adapted to roll on the ground adjacent a plow moldboard and to receive soil turned by the latter for disintegration and inversion, a mounting for said cage comprising a shaft disposed on an inclined plane on which said cage is rigidly mounted, a ball and socket carried by the upper end of said shaft, a tapered pin carried by said ball, a bracket mounted on the frame of a plow apertured to receive said pin, a second collar loosely mounted intermediate the ends of said shaft and held against longitudinal movement thereon and flexible means having one end connected to said collar and its opposite end to said plow frame for restricting the displacement range of said cage.

4. An attachment for a soil turning plow for destroying noxious vegetation, an open substantially coniform cage disposed to receive the soil turned by the moldboard of said plow, a mounting for said cage comprising a shaft rotatably connected to the beam of said plow and extending downwardly at an angle with respect to the ground, a collar rigidly secured to said shaft adjacent its lower end, spokes affixed to said collar and extending radially outward to engage said cage, a second collar loosely mounted on said shaft and spaced upward from said first collar and flexible means connected to said second collar and adjustably to the frame of said plow for restricting the displacement range of said cage.

JOHN K. BOONE.